Dec. 26, 1961 E. C. CLAY 3,014,644

TYPEWRITER TAPE PUNCH

Filed Feb. 17, 1960 9 Sheets-Sheet 1

INVENTOR.
EVERETT C. CLAY
BY Ralph C. Dustin
ATTORNEY.

Dec. 26, 1961 E. C. CLAY 3,014,644

TYPEWRITER TAPE PUNCH

Filed Feb. 17, 1960 9 Sheets-Sheet 2

Dec. 26, 1961 E. C. CLAY 3,014,644

TYPEWRITER TAPE PUNCH

Filed Feb. 17, 1960 9 Sheets-Sheet 5

Dec. 26, 1961 E. C. CLAY 3,014,644

TYPEWRITER TAPE PUNCH

Filed Feb. 17, 1960 9 Sheets-Sheet 6

Dec. 26, 1961 E. C. CLAY 3,014,644

TYPEWRITER TAPE PUNCH

Filed Feb. 17, 1960 9 Sheets-Sheet 7

FIG. 7

| | 78-1 | 78-2 | 78-3 | 78-4 | 78-5 |
|---|---|---|---|---|---|
| A | X | X | | | |
| B | X | | | X | X |
| C | | X | X | X | |
| D | X | | | X | |
| E | X | | | | |
| F | X | | X | X | |
| G | | X | | X | X |
| H | | | X | | X |
| I | | X | X | | |
| J | X | X | | X | |
| K | X | X | X | X | |
| L | | X | | | X |
| M | | | X | X | X |
| N | | | X | X | |
| O | | | | X | X |
| P | | X | X | | X |
| Q | X | X | X | | X |
| R | | X | | X | |
| S | X | | X | | |
| T | | | | | X |
| U | X | X | X | | |
| V | | X | X | X | X |
| W | X | X | | | X |
| X | X | | X | X | X |
| Y | X | | X | | X |
| Z | X | | | | X |
| 0 | | X | X | | X |
| 1 | X | X | X | | X |
| 2 | X | X | | | X |
| 3 | X | | | | |
| 4 | | X | | X | |
| 5 | | | | | X |
| 6 | X | | X | | X |
| 7 | X | X | X | | |
| 8 | | X | X | | |
| 9 | | | | X | X |

Dec. 26, 1961

E. C. CLAY 3,014,644

TYPEWRITER TAPE PUNCH

Filed Feb. 17, 1960

9 Sheets-Sheet 9

United States Patent Office 3,014,644

Patented Dec. 26, 1961

3,014,644

TYPEWRITER TAPE PUNCH

Everett C. Clay, Lexington, Ky., assignor to International Business Machines Corporation, New York, N.Y., a corporation of New York Filed Feb. 17, 1960, Ser. No. 9,363

4 Claims. (Cl. 234—23)

This invention relates to key operated punch mechanisms, and more particularly to mechanisms which operate on the actuation of keys of a typewriter to punch information in a tape in coded form. When keys are provided for all of the alphabetic and numeric characters, and this information is punched in a tape in the form of various hole combinations at five code positions, it is necessary that different characters be represented by the same combinations of holes. It is not possible to obtain enough code combinations with only five positions to represent each character by a different code. A common practice has been to punch a "letters" shift code preceding hole combinations representing alphabetic characters and a "figures" shift code preceding the numeric hole combinations. When reading the tape, the shift code is read first and then the following hole combinations are interpreted as characters designated by the shift code. This continues until the next shift code combination of holes is sensed.

An object of this invention is to provide an improved key operated punch mechanism.

Another object is to provide an improved punch mechanism operated from the keys of a typewriter and having controls which operate automatically on the first actuation of a "letters" key or a "figures" key to punch either a "letters" shift code or a "figures" shift code followed by a punching of a hole combination representative of the character. Continued actuation of either "letter" keys or "figure" keys after the first results only in the punching of hole combinations representative of the characters corresponding to the keys actuated.

Other objects of the invention will be pointed out in the following description and claims and illustrated in the accompanying drawings, which disclose, by way of example, the principle of the invention and the best mode, which has been contemplated, of applying that principle.

Figure 1:
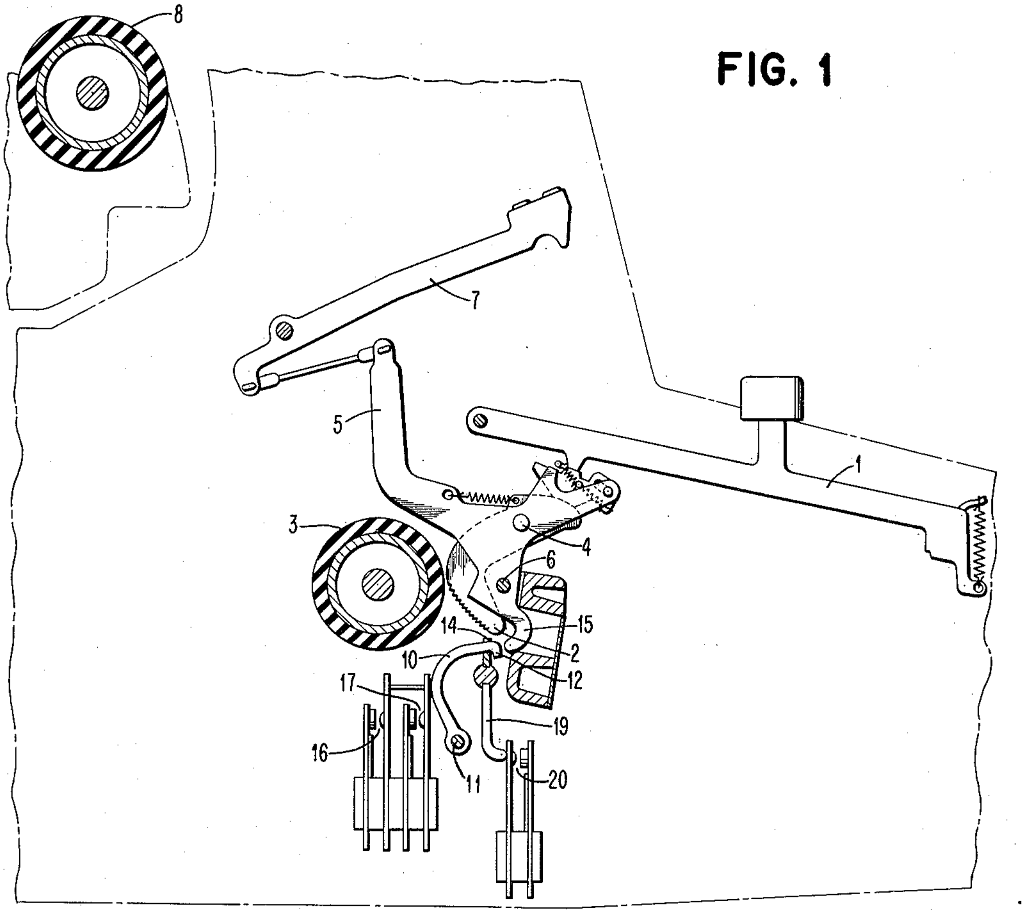
FIG. 1 is a vertical sectional view of a typewriter keyboard showing a mechanism for driving a type bar into engagement with a platen in response to actuation of a key lever and having associated therewith contacts which are closed during operation of the mechanism.
Figure 2:
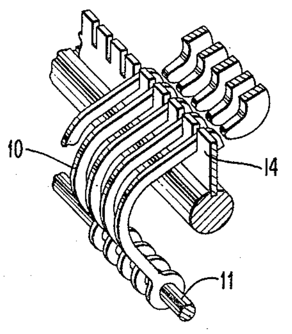
FIG. 2 is an enlarged perspective view of a portion of the mechanism shown in FIG. 1.
Figure 6A:
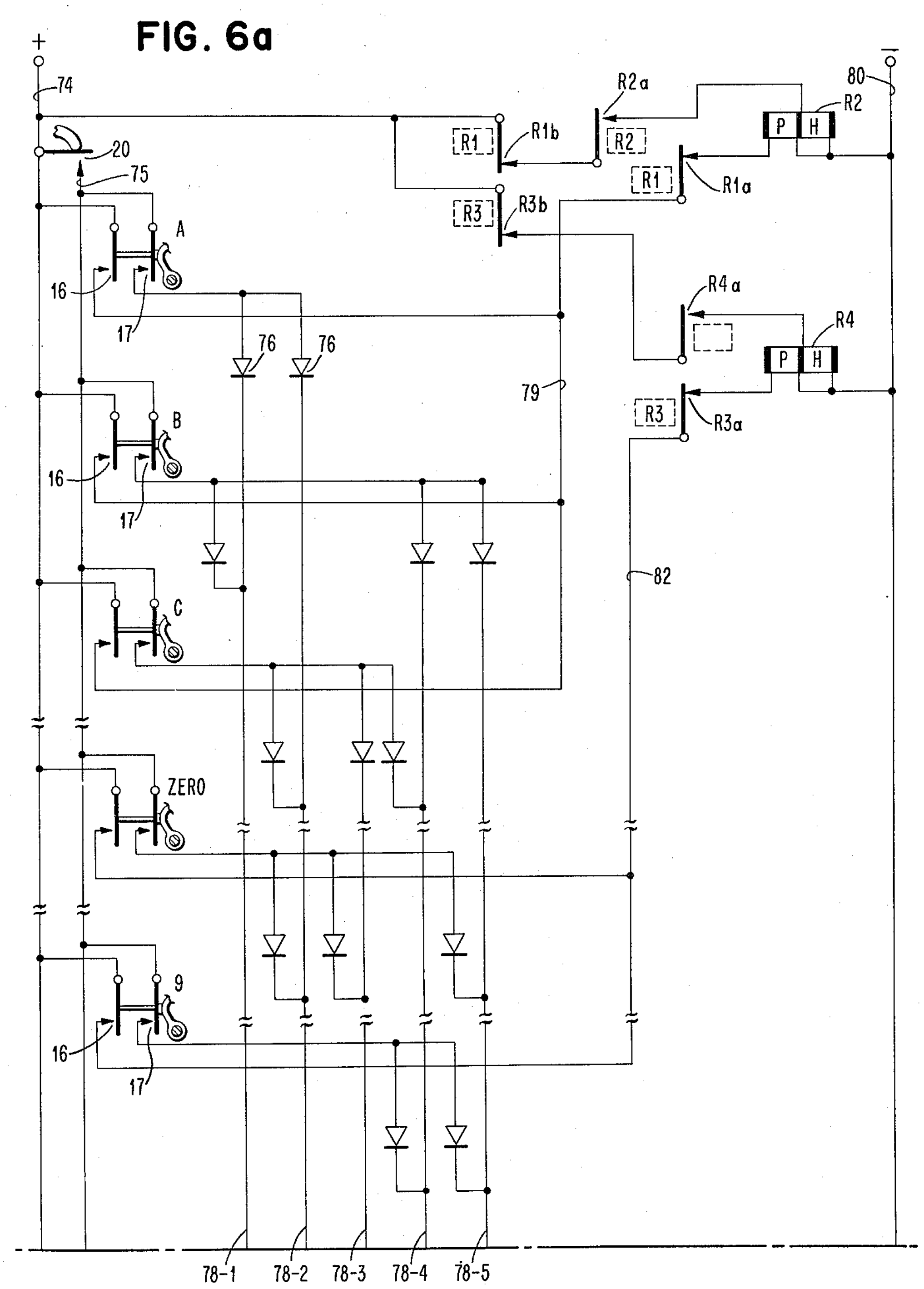
Figure 6B:
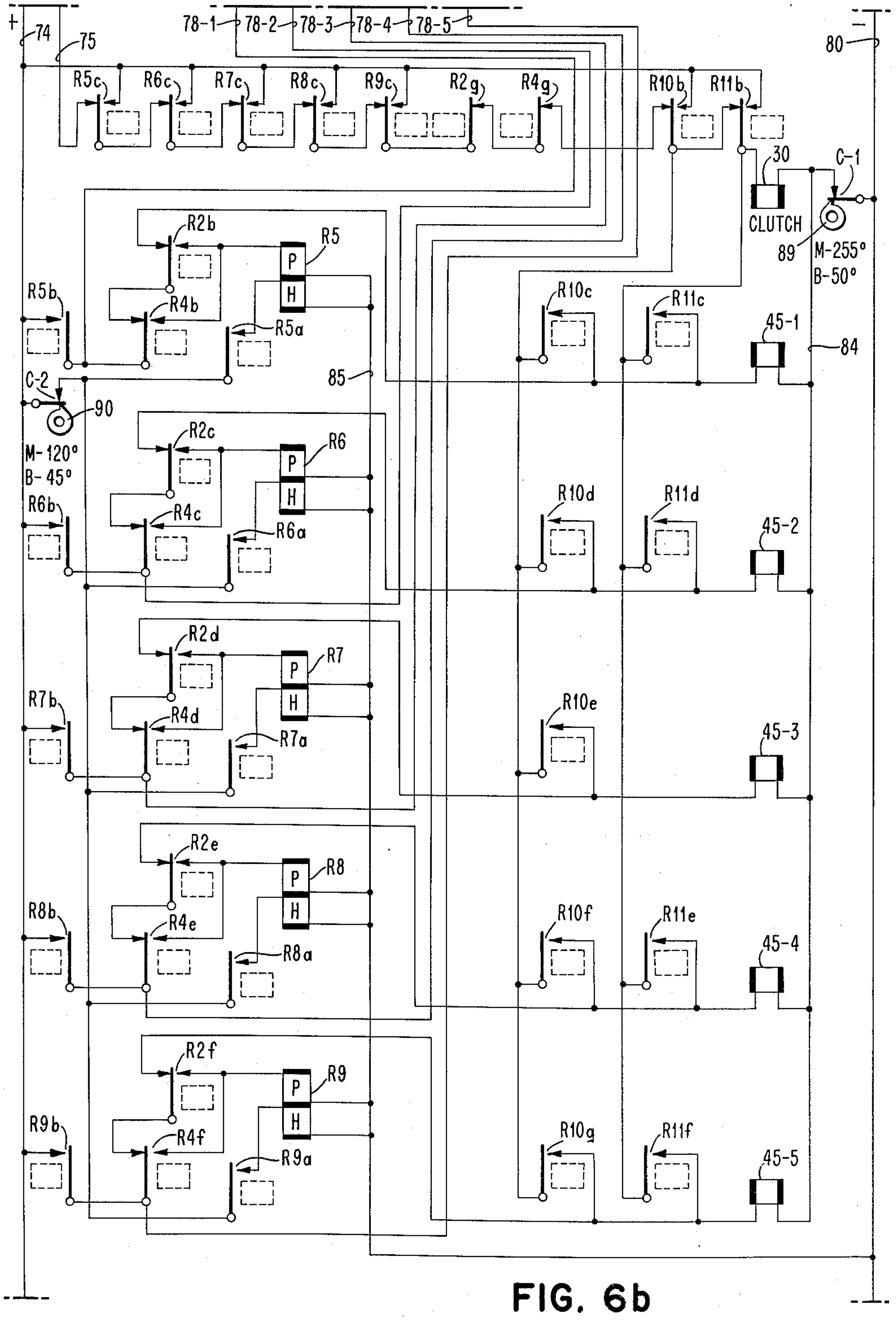
Figure 6C:
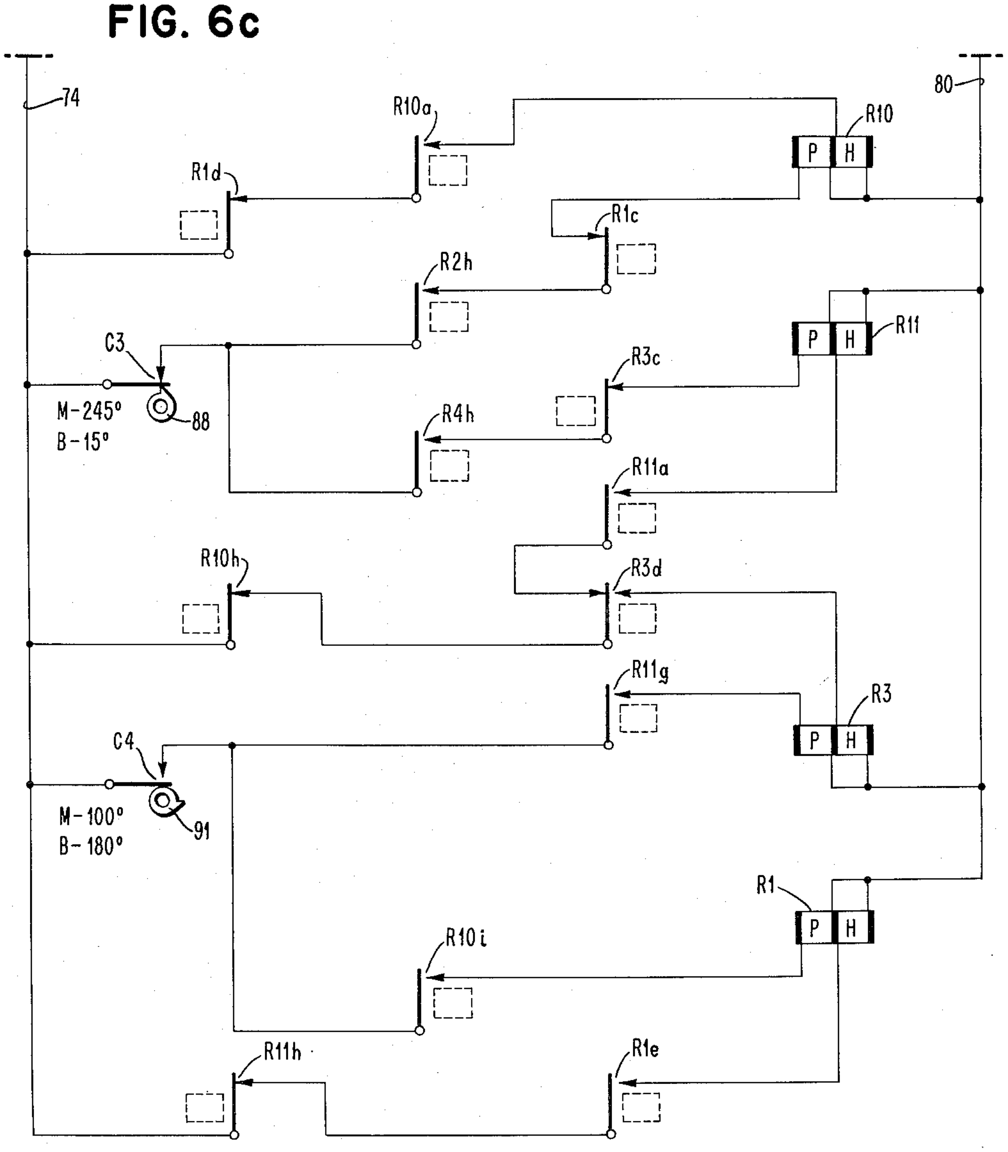

FIGS. 6*a*, 6*b* and 6*c* show a circuit diagram for controlling operation of the punch mechanism in response to the closing of contacts shown in FIG. 1.

FIG. 7 indicates the circuit connections for typewriter contacts to effect the punching of holes representing alphabetic and numeric characters.

Figure 8:
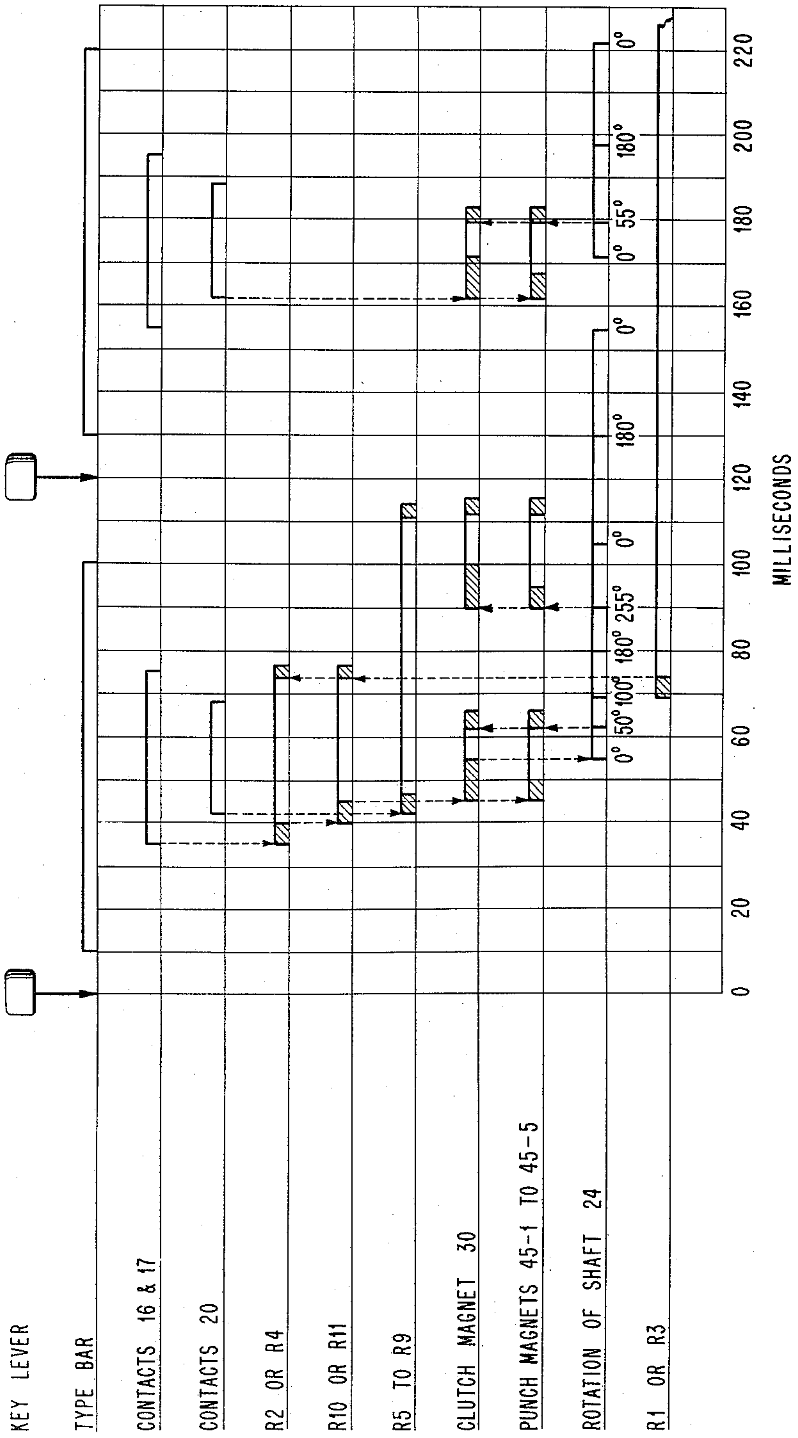

FIG. 8 is a timing diagram.

The typewriter with which the improved punch mechanism is associated includes, as shown in FIG. 1, a key lever 1 which may be depressed manually to rock a cam 2 into engagement with a continuously rotating power roll 3. Cam 2 is pivotally connected at 4 to a cam lever 5 which is mounted to swing about a pivot 6. As the cam is driven by the power roll, the cam lever is caused to swing in a clockwise direction about its pivot 6 and drive a type bar 7 into engagement with a platen 8. A separate key lever is provided on the typewriter for each alphabetic and numeric character, and a mechanism like that described above is provided for each key lever to effect the driving of a type bar for printing a character corresponding to the key actuated.

Arranged in vertical alignment with each cam lever is an interposer 10 pivotally supported by a shaft 11 and having a hooked portion 12 engaging a bail 14. Formed on each cam lever is a tail portion 15 engageable with its interposer for rocking the latter in a counterclockwise direction to close two pairs of contacts 16 and 17. A rocking of any one of the interposers causes the bail 14 to rock with it and swing a bail arm 19 in a direction to close a pair of contacts 20. The arrangement is such that the contacts 16 and 17 are closed first and then the contacts 20 are closed. It will be understood that the actuation of each interposer causes a different pair of contacts 16, 17 to be closed, but the contacts 20 are common to all of the interposers and are closed each time a type bar is driven.

Figure 3:
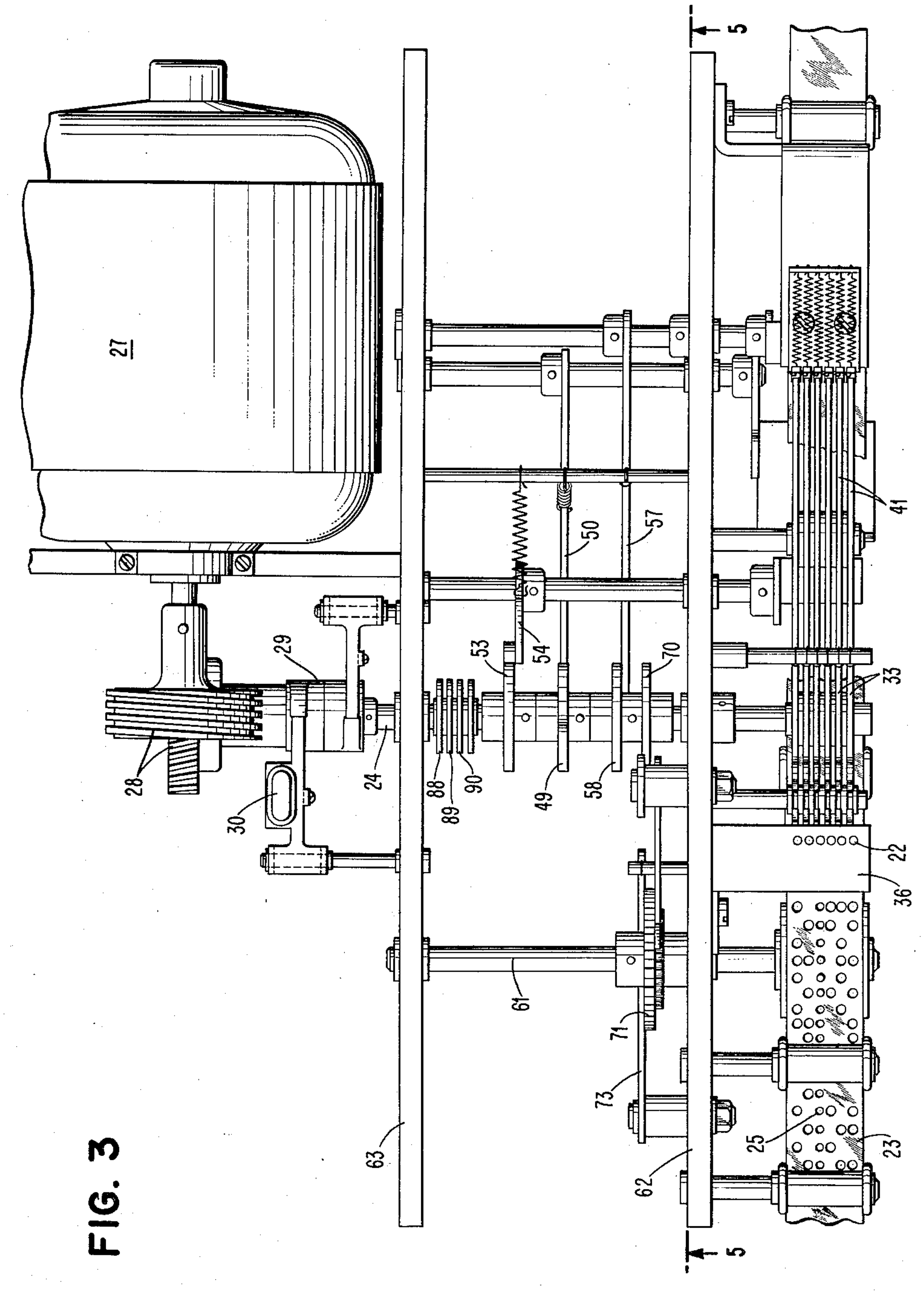
FIG. 3 is a plan view of a mechanism for punching holes in paper tape.
Figure 4:
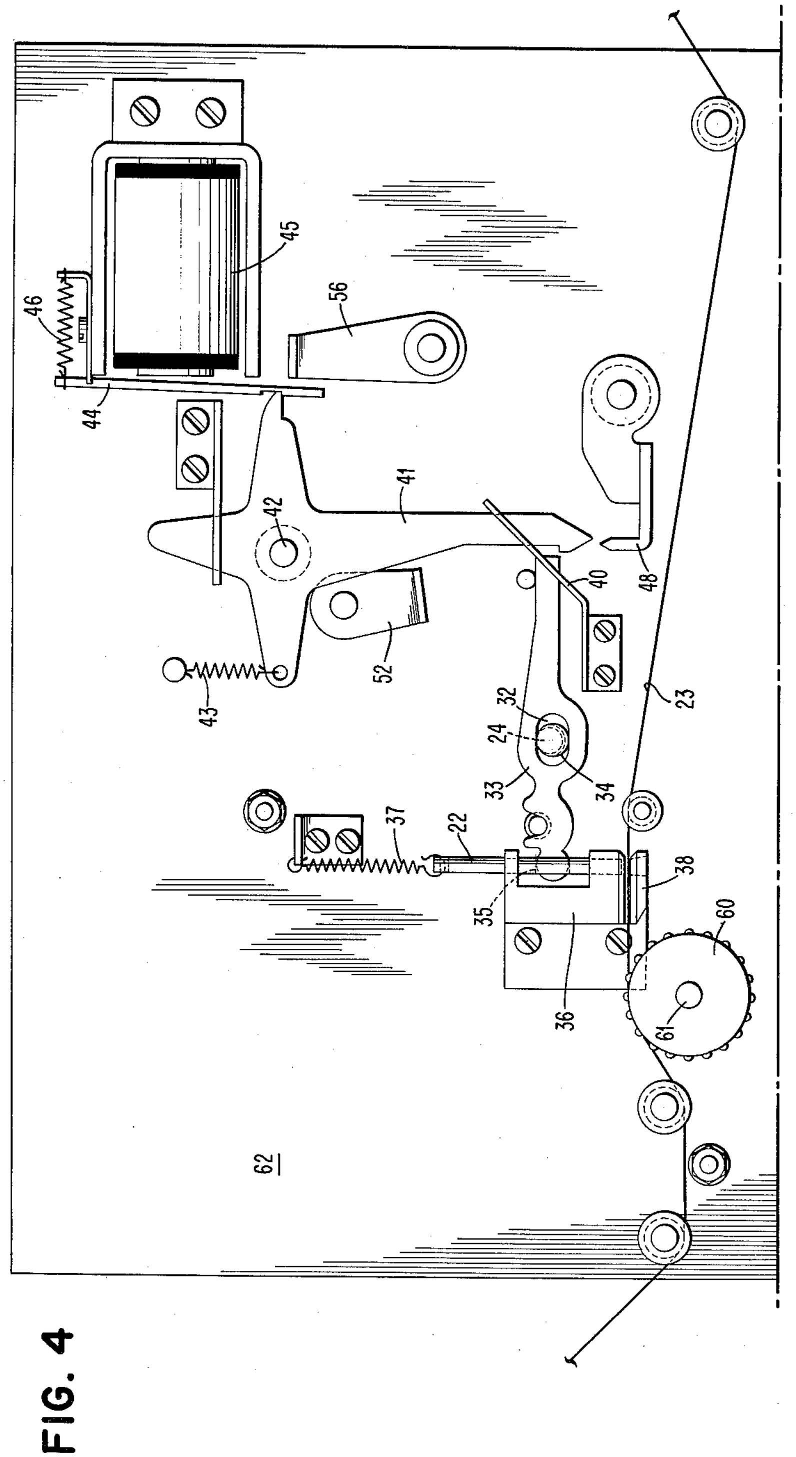
FIG. 4 is a front elevational view of the punch mechanism shown in FIG. 3.

Associated with the typewriter is a tape punch which is substantially like that covered by U.S. Patent 2,346,-267 to A. W. Mills et al. As shown in FIG. 3, six punch elements 22 are provided for punching holes in a tape 23. One of the punch elements is operated on each rotation of a shaft 24 to punch a tape feed hole 25, and the other punch elements are operated in different combinations to punch holes representing characters. For driving the punch mechanism, there is provided a motor 27 operating through gearing 28 and a conventional clutch 29 controlled by a magnet 30, to drive the shaft 24. When the magnet 30 is pulsed, the clutch 29 connects the motor 27 to the shaft 24 for driving the latter only one revolution. The forward portion of the shaft 24 extends, as shown in FIGS. 3 and 4, through elongated slots 32 in punch levers 33. Mounted upon the shaft is an eccentric member 34 having a close rotating fit within each of the slots 32. One end of each punch lever fits within a notch 35 cut in the side of its associated punch element 22 which is slidably received within openings in a guide block 36. Springs 37 normally hold the punch elements in raised positions above a die plate 38 over which the tape 23 passes. If the opposite ends of the punch levers are not held stationary, then a rotation of the shaft 24 causes the free ends of the punch levers to oscillate up and down between fingers of a guide comb 40. When, however, a latch member 41 is moved into engagement with the free end of one of the punch levers, the other end is caused to oscillate and drive its punch element through the tape.

Each of the punch levers engaging punch elements which punch character code holes is provided with a latch member 41 like that shown in FIG. 4. These are pivotally supported on a stud 42 and are urged by springs 43 in a direction to engage the punch levers. An armature 44 of a punch magnet 45 is normally held by a spring 46 in a position to engage an arm on the latch member for holding the latter out of engagement with its punch lever. Upon pulsing the magnet 45, the armature 44 is disengaged from the latch member permitting it to swing to a position engaging its punch lever.

To assure that each latch member is either fully engaged with its punch lever or is free of the latter, a bail 48 is rocked against the lower wedge shaped ends of the latch members for camming them either toward or away from the punch levers. This bail is actuated by a cam 49, FIG. 3, mounted on shaft 24 and engaging a follower on an arm 50 fixed to the bail. After the punching of holes has been completed, a bail 52 is actuated to move any released latch members out of engagement with their punch levers. Driving of the bail 52 is effected by a cam 53 mounted on shaft 24 and engaging a follower on an arm 54 fixed to the bail 52. As soon as the latch members have been disengaged from their punch levers, the armatures 44 are positively driven by a bail 56 into positions for engaging the latch members. The bail 56 is operated by an arm 57 fixed to the bail and carrying a follower engaging a cam 58 fixed to the shaft 24. The latch member for the punch element forming the feed hole in the tape may be like the latch members 41, but the bail 52 is shaped at a point opposite this member so the latter is never disengaged from its punch lever. No magnet is needed for this latch member since it always remains in active position.

Figure 5:
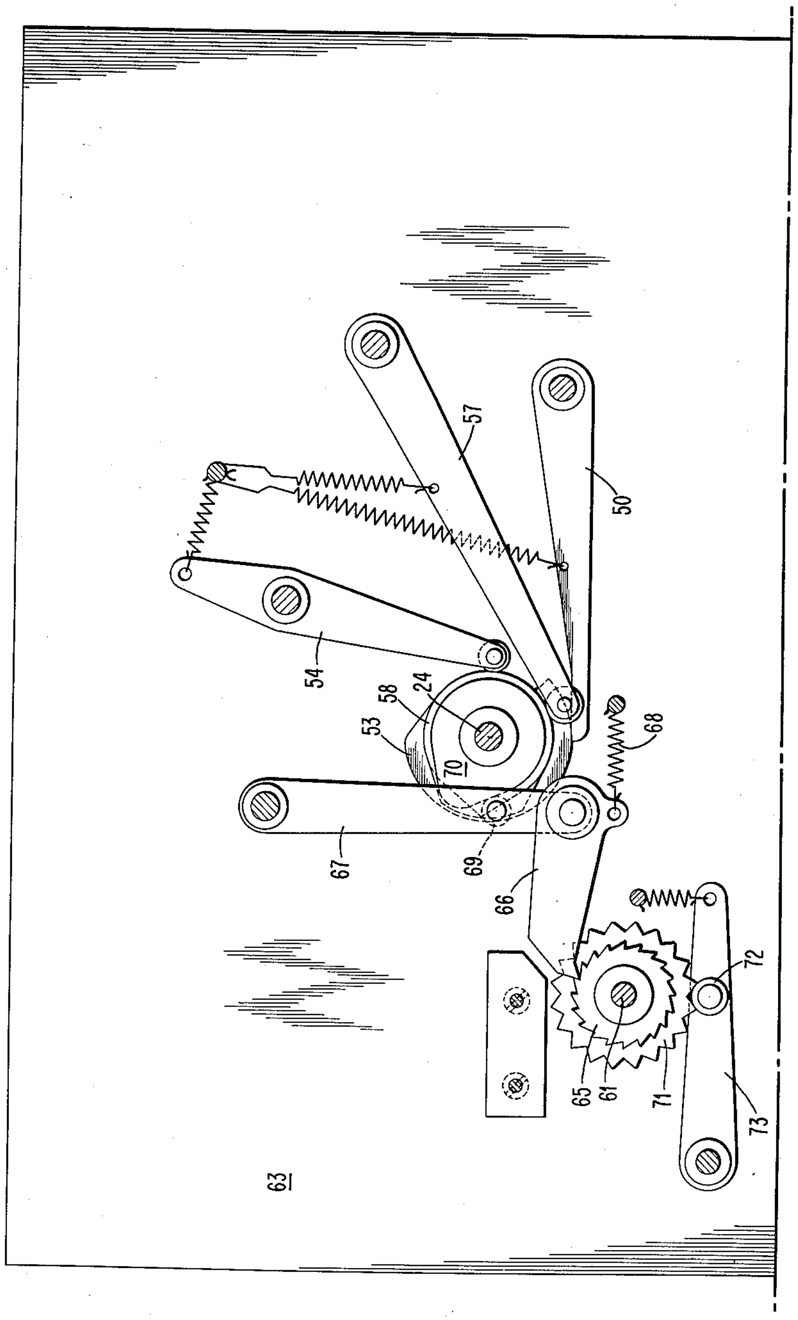
FIG. 5 is a vertical sectional view of the punch mechanism taken on the line 5—5 of FIG. 3.

After each operation of the punch elements to form holes in the tape, a mechanism is operated to advance the tape to a new position for punching. The tape feeding mechanism includes a sprocket wheel 60, FIG. 4, engaging the tape and fixed to a shaft 61 rotatably supported by vertical plates 62 and 63. Fixed to the shaft 61 is a ratchet wheel 65, FIG. 5, engaged by a dog 66 pivotally connected to a lever 67 mounted on the plate 62. A spring 68 holds the dog in yielding engagement with the ratchet wheel. Mounted on the lever 67 is a follower 69 engaged by a cam 70 on the shaft 24 to effect a driving of the ratchet wheel in a direction to advance the tape. Fixed to the shaft 61 is a detent wheel 71 engaged by a roller 72 on a lever 73 for accurately positioning the sprocket wheel on each forward stepping of the tape.

On energizing the clutch magnet 30 and some combination of punch magnets 45, the mechanism described above is operated one cycle to punch holes in the tape and advance the latter to a new position. An energizing of the various magnets takes place on depression of any one of the typewriter key levers. The first depression of a key lever results in two cycles of operation by the punch. If a key lever for an alphabetic character is actuated, the punch operates on the first cycle to punch a "letters" shift code and on the second cycle to punch holes representative of the character for the key depressed. As long as alphabetic keys are depressed after that, the punch operates only one cycle to form holes corresponding to the letters of the keys. If a numeric key is actuated either first or at any time after actuating a letters key, the punch operates two cycles to punch a "figures" shift code and then a code corresponding to the figure of the key actuated. Continued actuation of numeric keys results in one cycle of operation by the punch to form holes corresponding to the number of each key.

The circuitry for producing the above described operation is shown in FIGS. 6*a* to 6*c*. It will be noted in FIG. 6*a* that one side of the contacts 16, closed while a type bar 7 is being driven, are connected directly to a conductor 74 leading to the positive side of a power source. One side of the contacts 17 are connected to a common conductor 75 leading through the common contacts 20 to the positive side of the power source. The other side of the contacts 17 are connected through rectifying diodes 76 to one or more of five conductors 78—1 to 78—5. Only the contacts 16, 17 corresponding to the key levers for the characters A, B, C, zero and 9 are shown in FIG. 6*a*. FIG. 7 indicates the conductors 78—1 to 78—5 to which the contacts 17 are connected for all characters. The other side of the contacts 16 for all alphabetic characters are connected to a common conductor 79 which leads through relay contacts R1*a* (normally closed) and the pick winding of relay R2 to a conductor 80 connected to the negative side of the power source. The other side of the contacts 16 for the numeric key levers are connected to a common conductor 82 leading through relay contacts R3*a* (normally closed) and the pick winding of a relay R4 to the conductor 80. As soon as relay R2 picks up, a hold circuit is established through a circuit leading from conductor 74 through relay contacts R1*b*, contacts R2*a*, and the hold winding of relay R2 to the conductor 80. In a similar manner, the picking of relay R4 results in the closing of a hold circuit including relay contacts R3*b*, contacts R4*a* and the hold winding of relay R4.

Referring to FIG. 6*b* it will be noted that conductor 78—1 is connected through relay transfer contacts R4*b* (normally closed), R2*b* (normally closed) and one of the punch magnets 45—1 to a common conductor 84. In a similar manner, conductors 78—2 to 78—5 are connected through other transfer contacts of relays R2, R4, punch magnets 45—2 to 45—5, respectively, and the conductor 84 which, in turn, is connected through cam contacts C–1 to the power conductor 80. The normally open sides of the relay transfer contacts R2*b*, R4*b* to R2*f*, R4*f* are connected through the pick windings of memory relays R5 to R9, respectively, and a common conductor 85 to the power conductor 80. Relay R5 is held up by a circuit extending from its hold winding through its own contacts R5*a* and cam contacts C–2 to the positive power conductor 74. The other side of the hold winding is connected through the conductor 85 to the negative power conductor 80. Relays R6 to R9 are provided with similar hold circuits. Another hold circuit for relay R5 extends from conductor 74 through its own contacts R5*b* and either the contacts R4*b* (normally open) or R2*b* (normally open) to its pick winding. Similar hold circuits are provided for relays R6 to R9.

The normally closed sides of relay transfer contacts R5*c* to R9*c*, R2*g*, R4*g*, R10*b* and R11*b* are connected in series, as shown in FIG. 6*b*, between the conductor 75 and the clutch magnet 30 which is connected at its other side through cam contacts C–1 to the conductor 80. Normally open sides of the contacts R5*c* to R9*c*, R10*b* and R11*b* are connected to the positive conductor 74. The movable contact for R10*b* is connected to one side of each of the normally open contacts R10*c* to R10*g*, and the movable contact for R11*b* is connected to one side of the normally open contacts R11*c* to R11*f*. The other side of the contacts R10*c* to R10*g* are connected to the punch magnets 45—1 to 45—5, and the other side of the contacts R11*c* to R11*f* are connected to punch magnets 45—1, 45—2, 45—4 and 45—5, respectively.

Relay R10 is picked up as shown in FIG. 6*c*, by a circuit extending from conductor 74 through cam contacts C3, relay contacts R2*h*, R1*c* and its pick winding to the conductor 80. It is held up through its own contacts R10*a* and relay contacts R1*d*. Relay R11 is picked up through the cam contacts C–3, the relay contacts R4*h*, R3*c* and its pick winding. A hold coil for relay R11 is energized by a circuit extending from conductor 74 through relay contacts R10*h*, R3*d* (normally closed), R11*a* and the hold coil to the conductor 80. Relay R3 is picked up through cam contacts C4 and relay contacts R11*g*, and is held up through relay contacts R10*h* and R3*d* (normally open). Relay R1 is picked through cam contacts C4 and relay contacts R10*i*, and is held up through relay contacts R11*h* and R1*e*.

The operation of the system described is as follows. Assuming that the typewriter has just been started and the first key lever has been depressed to effect a printing of the letter "A." Referring to the timing diagram, FIG. 8, it will be noted that the type bar for the letter "A" is started toward the platen 10 milliseconds after the key lever is depressed. Twenty-five ms. later the contacts 16 and 17 are closed. The closing of contacts 16 completes a circuit through relay contacts R1*a* and the pick winding of relay R2. Contacts 17 do not complete a circuit at this time because the common contacts 20 do not close until 7 ms. later. Five milliseconds after pulsing relay R2 its contacts close and complete several circuits. One of these is a holding circuit including relay contacts R1*b* and R2*a* (now closed). Another is a circuit for picking up relay R10 (FIG. 6*c*). This circuit includes contacts C3 operated by a cam 88 on the shaft 24 driving the punch elements 22. These cam contacts are closed before a driving of the shaft takes place. As indicated, they break after the shaft rotates 15° and don't make again until it has rotated 245°. From contacts C3, the circuit extends through relay contacts R2*h* (now closed), R1*c* and the pick winding of relay R10. Its contacts close 5 ms. later and establish a holding circuit through contacts R1*d* and R10*a*. At the same time, its contacts R10*b* (FIG. 6*b*) transfer and its contacts R10*c* to R10*g* close. The transfer of contacts R10*b* completes a circuit from the positive conductor 74 through R10*b* (normally open), R11*b* (normally closed), and the clutch magnet 30 to the contacts C1 controlled by a cam 89 on shaft 24. Other parallel circuits are completed from the contacts R10*b* through relay contacts R10*c* to R10*g* and punch magnets 45—1 to 45—5 to the cam contacts C1 which are closed until the punch shaft rotates 50°.

Between the first pulsing of the pick winding for relay R10 and the closing of its contacts, the common contacts 20 in the typewriter are closed. This completes circuits through the contacts 17 for the "A" type bar to two parallel paths, one including conductor 78—1, the relay transfer contacts R4*b* (normally closed), transfer contacts R2*b* (normally open) and the pick winding of relay R5 to the negative side of the power source, and the other including conductor 78—2, the relay transfer contacts R4*c* (normally closed), transfer contacts R2*c* (normally open) and the pick winding of relay R6 to the negative side of the power source. Relays R5 and R6 operate after 5 ms. to close their contacts R5*a*, R6*a* and R5*b*, R6*b* to complete separate holding circuits. Contacts R5*c* and R6*c* also transfer but accomplish nothing at this time because the contacts R10*b* are already transferred.

With the clutch magnet 30 and the punch magnets 45—1 to 45—5 all energized by the operation of contacts for relay R10, the shaft 24 is driven and effects a punching of holes in all character index positions on the tape. This is the combination of holes representing "letters" shift. As soon as shaft 24 rotates 50°, cam contacts C–1 open and break circuits through the clutch and punch magnets. Shaft 24 continues to be driven, however, until it has completed one revolution.

The holding circuits for relays R5, R6 including the contacts R5*a* and R6*a* are connected, as shown in FIG. 6*b*, through contacts C–2 driven by a cam 90 on shaft 24. When this shaft rotates 45°, contacts C–2 open to break the holding circuits through R5*a* and R6*a*. This is ineffective, however, since contacts R5*b*, R6*b* are closed and maintain circuits through the pick windings of the relays.

When the shaft 24 has rotated 100°, the cam contacts C–4 driven by cam 91 on shaft 24, close and complete a circuit through contacts R10*i* and the pick winding of relay R1. Its contacts R1*e* close 5 ms. later to establish a holding circuit. At the same time, its contacts R1*a* and R1*b* (FIG. 6*a*) in the pick and hold circuits, respectively, of relay R2, open. Contacts R1*c* and R1*d* (FIG. 6*c*) also open in the pick and hold circuits of relay R10. Three ms. later, both relays R2 and R10 drop their contacts in their own hold circuits. Relay R2 also drops its contacts R2*h* in the pick circuit for relay R10, and relay R10 drops its contacts R10*i* in the pick circuit for relay R1. All of the transfer contacts R2*b* to R2*f* move to the positions shown in FIG. 6*b* when relay R2 is de-energized. Contacts R10*b* to R10*g* also move to the positions shown with relay R10 de-energized.

Between the time of pulsing relay R1 and the closing of its contacts, the shaft 24 will have rotated 120°. At this time, the cam contacts C–2 (FIG. 6*b*) close again and re-establish holding circuits through contacts R5*a*, R6*a* to relay R5 and R6. These relays had been held up through contacts R5*b* and R6*b* while the cam contacts C2 were open. Five ms. after closing contacts C2, the relay contacts R2*b* to R2*f* move to the positions shown. A circuit is then completed from conductor 74 through contacts R5*b*, R4*b* (normally closed), and R2*b* (normally closed) to the punch magnet 45—1. A similar circuit is completed through contacts R6*b* to the punch magnet 45—2. No other circuits are completed to punch magnets because none of the relays R7 to R9 were picked by the operation of the "A" key lever. Relay contacts R5*c* and R6*c* are also transferred at this time but only contacts R6*c* are effective. These complete a circuit from the positive conductor 74 through R6*c* (normally open), R7*c* to R9*c* (normally closed), R2*g*, R4*g*, R10*b* (normally closed) and R11*b* (normally closed) to the clutch magnet 30. As soon as the cam contacts C–1 close at 255° of the preceding cycle, the clutch magnet 30 and the punch magnets 45—1 and 45—2 are energized to start another punch cycle and punch holes representative of the letter "A."

At 45° in the second cycle, the cam contacts C–2 open and drop the hold circuits for relays R5 and R6. At 50° in this cycle, cam contacts C–4 open the circuits through the clutch and punch magnets. With relays R5 and R6 de-energized, the contacts R5*b*, R6*b* open and the contacts R5*c*, R6*c* return to normal open positions. As soon as the second punch cycle has been completed, the clutch 29 disengages and the punch mechanism comes to rest. All of the circuits except that for holding relay R1 have returned to normal. It will be noted that the hold winding for relay R1 is still energized through contacts R11*h* and R1*e*. This means that relay R2 cannot be picked up again on actuation of another "letters" key since the relay contacts R1*a* are now held open.

Assuming that the key for the letter "A" is again depressed. Nothing happens on the closing of contacts 16 since the relay R2 cannot be picked up. As soon as the common contacts 20 close, circuits are completed through the contacts 17 and conductors 78—1, 78—2 to the punch magnets 45—1 and 45—2. Another circuit is completed from the contacts 20 through conductor 75, relay contacts R5*c* to R9*c* (normally closed), R2*g*, R4*g* and R10*b*, R11*b* (normally closed) to the clutch magnet 30. The circuits for the clutch magnet and punch magnets extend through the cam contacts C–1 to the negative conductor 80. The punch is then driven one cycle to punch the letter "A." If any other "letters" key had been depressed, the operation would have been the same except that a different combination of punch elements would have been actuated.

If a "figures" key is depressed following the depression of a "letters" key, the operation is similar to that described above for the first depression of a "letters" key. In this case, the closing of contacts 16 result in the picking up of relay R4 instead of R2. This causes relay R11 to be energized through cam contacts C3, relay contacts R4*h* and R3*c*, and the pick winding of relay R11. Contacts R11*b* (FIG. 6*b*) transfer to energize the clutch magnet 30, and contacts R11*c* to R11*f* close to complete circuits to punch magnets 45—1, 45—2, 45—4 and 45—5. Punch elements are then actuated under control of these magnets to punch holes in the tape for the "figures" shift code.

When the relay R4 was picked up, its contacts R4*b* to R4*f* (FIG. 6*b*) were transferred. As soon as the common contacts 20 close, circuits are completed through the contacts 17 and some combination of conductors 78—1 to 78—5 to relays R5 to R9. Corresponding contacts R5*c* to R9*c* are then transferred to maintain a circuit to the clutch magnet when the first cycle ends. Hold circuits are maintained for relays R5 to R9 until they are opened by the cam contacts C–2 in the second cycle.

Relay R1, held up during operation of "letters" keys, is dropped by contacts R11*h* soon after relay R11 is energized. At the same time, contacts R11*g* close to effect an energizing of relay R3 when the cam contacts C–4 make at 100°. Relay R3 opens its contacts R3*a* to drop relay R4, and transfers its contacts R3*d* to establish its owen hold circuit. When relay R4 drops, its contacts R4*b* to R4*f* transfer and complete circuits to the punch magnets corresponding to the picking of relays R5 to R9 through conductors 78—1 to 78—5. The contacts R5*c* to R9*c* corresponding to the relays picked remain transferred at the end of the first cycle and energize the clutch magnet 30 to start the second cycle. During the second cycle, the punch elements operate to form holes corresponding to the figure of the key actuated. When this cycle is completed, all relays except R3 are deenergized, and R3 continues to be energized through contacts R10*h* and R3*d* (transferred) until a "letters" key is depressed. When a second "figures" key is depressed, relay R4 is not picked up because contacts R3 are open. On the closing of the common contacts 20, the clutch magnet 30 and the punch magnets are immediately energized in the same manner as was described above for the second operation of a "letters" key.

While there has been described one form which the invention may assume in practice, it will be understood that it may be modified and embodied in various other forms without departing from the spirit or the scope of the appended claims.

What is claimed is:

1. A typewriter controlled punch mechanism comprising, in combination, a typewriter having alphabetic and numeric type keys, a plurality of punch elements, means operating on the first depression of either an alphabetic key or a numeric key to punch holes according to either a letters shift code or a figures shift code and then to punch holes representative of the character for the key depressed, and operating on successive depression of other keys similar to the first to effect a punching of holes representative only of the characters for the keys depressed, said means including magnets controlling said punch elements, a memory relay associated with each of said magnets, a pair of contacts associated with each of said type keys, a source of electric energy, circuits normally connecting said pair of contacts for each type key between said source of energy and different combinations of said magnets, means operating on the first depression of a type key to transfer said circuit connections from said magnets to said memory relays and to pulse said magnets in combinations according to either a letters or a figures shift code depending on the character represented by the key depressed, means operated by said memory relays to which circuit connections are transferred for effecting a second pulsing of corresponding punch magnets, and means operating under control of said circuit transfer means for rendering the latter unresponsive to successive depressions of other type keys for characters similar to the one for the key first depressed.

2. The mechanism of claim 1 including a pair of contacts common to all of said type keys, means connecting said common contacts in series with one side of said source of energy and each of said pairs of contacts associated with said type keys, and means operating on the depression of any type key for closing said common contacts shortly after the operation of said circuit transfer means.

3. The mechanism of claim 1 including a driving means for said punch elements, a magnetic clutch operating when energized to effect a single cycle operation by said driving means to drive said punch elements, means controlled by said circuit transfer means for energizing said clutch when a type key is depressed, and means operated by said memory relays when circuit connections are transferred thereto for effecting a second energizing of said clutch.

4. A typewriter controlled punch mechanism comprising, in combination, a typewriter having type keys arranged in two groups, a plurality of punch elements, means operating on the first depression of any key in one or the other of said groups to punch holes according to one or another of two shift codes and then to punch holes representative of the character for the key depressed, and operating on successive depression of other keys in the same group as the first to effect a punching of holes representative only of the characters for the keys depressed, said means including magnets controlling said punch elements, a first control circuit for each of said magnets, a first pair of relays, each having a set of transfer contacts connected in each of said first control circuits, said transfer contacts being normally in position to complete circuits to said magnets, second control circuits connected in parallel to a selected combination of said magnets, a second control relay having normally open contacts connected in each of said second control circuits, third control circuits connected in parallel to a different combination of said magnets, a third control relay having normally open contacts connected in each of said third control circuits, a memory relay associated with each of said first control circuits and connected to the normally open sides of said transfer contacts in the circuit with which it is associated, holding circuits for said memory relays, pick circuits for said second and third control relays, one of said first pair of relays having normally open contacts connected in one of said pick circuits and the other of said first pair of relays having normally open contacts connected in the other of said pick circuits, a second pair of control relays, pick circuits for said second pair of relays, said second control relay having normally open contacts connected in the pick circuit of one of said second pair of relays and said third control relay having normally open contacts connected in the pick circuit for the other of said second pair of relays, pick circuits for said first pair of relays, said second pair of relays each having normally closed contacts connected in different ones of said pick circuits for said first pair of relays, holding circuits for said second pair of relays, said second and third relays having normally closed contacts connected in different holding circuits for said second pair of relays, a first set of contacts associated with each type key, those associated with the keys of one group being connected in the pick circuit for one of said first pair of relays and those associated with the other of said groups being connected in the pick circuit for the other of said first pair of relays, a second set of contacts associated with each type key, means connecting each of said second set of contacts to different combinations of said first control circuits, and common contacts for completing circuits through said second set of contacts after a circuit has been completed through said first set of contacts and the pick circuit for one of said first pair of relays.

References Cited in the file of this patent

UNITED STATES PATENTS 2,902,092 Hildebrandt ............. Sept. 1, 1959